(12) United States Patent
Chauhan

(10) Patent No.: US 10,417,652 B2
(45) Date of Patent: Sep. 17, 2019

(54) METHOD AND SYSTEM FOR TRACKING CONSUMER CONFIDENCE BASED ON TRANSACTION DATA

(71) Applicant: MasterCard International Incorporated, Purchase, NY (US)

(72) Inventor: Rohit Chauhan, Somers, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 875 days.

(21) Appl. No.: 14/531,347

(22) Filed: Nov. 3, 2014

(65) Prior Publication Data

US 2016/0125441 A1    May 5, 2016

(51) Int. Cl.
*G06Q 30/02* (2012.01)

(52) U.S. Cl.
CPC .............................. *G06Q 30/0205* (2013.01)

(58) Field of Classification Search
None
See application file for complete search history.

(56) References Cited

U.S. PATENT DOCUMENTS

| 2003/0061132 | A1* | 3/2003 | Yu, Sr. | G06Q 30/02 705/30 |
| 2008/0167905 | A1* | 7/2008 | Bredl | G06Q 40/08 705/4 |
| 2010/0082397 | A1* | 4/2010 | Blegen | G06Q 30/02 705/14.58 |

* cited by examiner

*Primary Examiner* — Alan S Miller
*Assistant Examiner* — Arif Ullah
(74) *Attorney, Agent, or Firm* — Ballad Spahr LLP

(57) ABSTRACT

A method of generating a more objective consumer confidence and more particularly to tracking consumer confidence objectively based on data regarding past transactions.

18 Claims, 6 Drawing Sheets

200

| MERCHANT ID | 200a |
| MERCHANT NAME | 200b |
| MERCHANT LOCATION | 200c |
| DISCRETIONARY/NON-DISCRETIONARY FLAG | 200d |

FIG. 2

METHOD AND SYSTEM FOR TRACKING CONSUMER CONFIDENCE BASED ON TRANSACTION DATA

FIELD

Aspects of the present disclosure relate in general to generating a consumer confidence index that is more objective than existing consumer confidence indices, and more particularly to tracking consumer confidence objectively based on data regarding past transactions.

BACKGROUND

Information about consumer confidence or consumer sentiment is useful for a variety of purposes. For example, information about how consumers feel about the state of the economy may be used by manufacturers, employers, and/or individuals as they make short-term or long-term employment, purchasing, or forecasting decisions. Some well-known consumer sentiment or consumer confidence indices include the University of Michigan consumer sentiment index, the Bloomberg consumer comfort index, the Consumer Confidence Index (CCI), the Consumer Confidence Average Index (CCAI), and the Gallup economic confidence index. Those indices are based on surveys of a number of individuals. Consumers are polled regarding confidence in the economy, and the results are aggregated and reported as an index. Indices formed in this manner may be deficient and/or biased based on the sample size, because only a small number of individuals can reasonably be interviewed. Furthermore, such responses may be unreliable due to the intrinsically subjective nature of the polling process, e.g., regarding bias based on media exposure, personal situations, etc.

SUMMARY

In some embodiments of the present disclosure, a system includes at least one processor and a display. A plurality of payment accounts are identified as corresponding to respective accountholders. A geographic distribution of the accountholders is statistically representative of a geographic distribution of consumers in a geographic region. At one or more processors, a plurality of card transactions associated are classified with the plurality of payment accounts over a time interval into a first set of transactions and a second set of transactions. The processors compute, for both sets of transactions, at least one card transaction based feature. The indication of consumer confidence is displayed for consumers in the geographic region based on the at least one card transaction based feature and the first and second sets of transactions.

BRIEF DESCRIPTION OF THE DRAWINGS

The following will be apparent from elements of the figures, which are provided for illustrative purposes and are not necessarily to scale.

FIG. 2 is a depiction of an electronic data table used in some embodiments.

DETAILED DESCRIPTION

This description of the exemplary embodiments is intended to be read in connection with the accompanying drawings, which are to be considered part of the entire written description.

In various embodiments of the present disclosure, consumer confidence is tracked in a more reliable, efficient, and useful way than has previously been done. Instead of relying on surveys and/or other forms of polling to attempt to discern what consumers perceive about the economy or their own financial situation, objective, quantified data are used. For example, transaction data regarding past transactions (e.g., purchases of goods and/or services) may be efficiently processed and analyzed in a computer system in a large-scale manner. Such transaction data may be readily available from records regarding card transactions that a card processing network maintains, for example. By using card transaction data, many of the sources of error associated with conventional polling-based consumer confidence indices can be mitigated or eliminated, and the process of determine consumer confidence can be easily scaled or adapted for consumers in any geographic region. Streamlining the data processing based on a consistent, readily available, well-quantified input data set (such as card transaction data) increases reliability and reproducibility of the resulting consumer confidence data.

Figure 1:
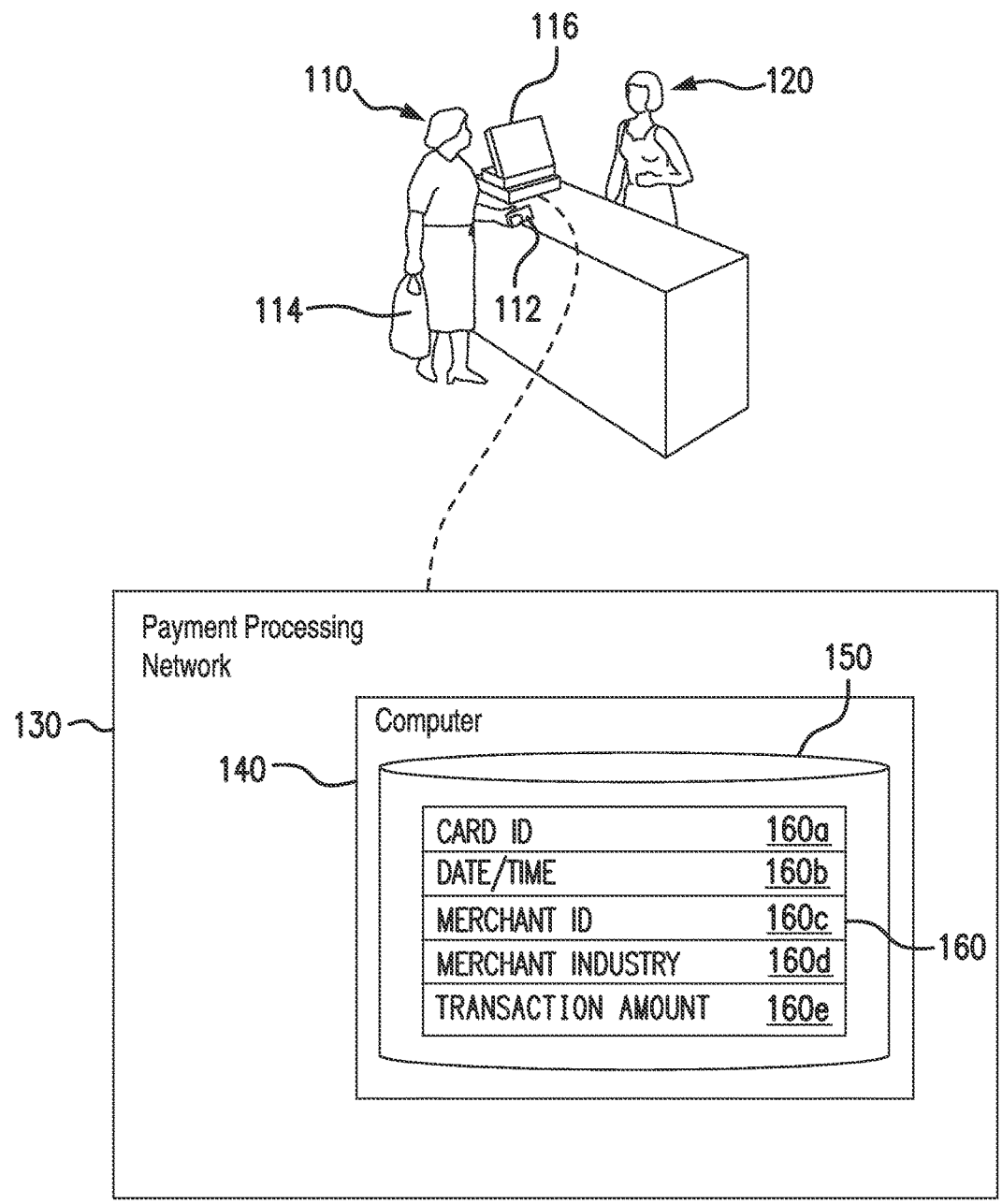
FIG. 1 is an illustration of an electronic message associated with a card transaction that is used in some embodiments of the present disclosure.

FIG. 1 is an illustration of an electronic message associated with a card transaction. A consumer 110 (also referred to as accountholder 110) presents a payment device 112 at a point of service (POS) terminal 116 as payment to a merchant 120 for a good or service 114. The payment device 112 may be any type of card usable for transacting with a merchant, e.g., a debit or credit card. In other embodiments, payment device 112 may be a virtual account device, mobile phone, tablet computer, personal digital assistant (PDA), cloud-based payment device, electronic wallet, or other electronic payment apparatus known in the art. The merchant 120 need not be a person who is physically present at the point of sale as depicted in FIG. 1, but may be any business entity. After various electronic communications associated with processing the payment device 112 and approval of the transaction by one or more remote entities, the transaction is concluded. An electronic message or record 160 of the transaction is generated and stored, e.g., in a database 150 of a computer 140 associated with a payment processing network 130 (also referred to as payment processor or payment network) that is involved in the electronic payment processing.

Message 160 may include various data regarding the transaction, including a card identifier 160*a* (e.g., a numeric string) associated with payment device 112, a date/time stamp 160*b*, a merchant identifier 160*c* associated with merchant 120, a merchant industry code 160*d* (e.g., the merchant category code or MCC known in the industry of electronic payment processing), and a transaction amount 160*e* (e.g., how much the consumer 110 paid as part of the transaction).

Referring to FIG. 2, the payment processing network 130 may also maintain an electronic data table 200 that may be referred to as a Merchant Master Table. Table 200 may include entries for respective merchants that can participate in card transactions capable of being processed by the payment processing network 130 (e.g., all participating merchants). Each entry in table 200 may include a field 200*a* for merchant identifier, field 200*b* for merchant name, field 200*c* for merchant location (e.g., address including ZIP code), and field 200*d* that may be a discretionary/non-discretionary flag. Table 200 may be stored in the same or a different database than message 160. The discretionary/non-discretionary flag at field 200*d* may be a binary indicator of whether a merchant is a proprietor of goods or services considered to be essentials or necessities (or, simply, non-luxury items) or, instead, discretionary purchase items, such as luxury items (e.g., luxury apparel). Although the term "purchase items" is used herein for convenience, it should be understood that various embodiments pertain to purchases (or rentals) of goods as well as services. Merchants are classified by industry categories. Industry categories may be classified as "non-discretionary" (such as groceries, and gasoline), "discretionary" (such as cruise lines and jewelry), or "mixed."

All merchants in an industry that is tagged as "Non-discretionary" (such as groceries) will be assigned a "non-discretionary" flag. Similarly, all merchants in an industry that is tagged as "discretionary" (such as luxury vendors) will be assigned a "discretionary" flag.

Merchants in the "mixed" category may be tagged as "non-discretionary" or "discretionary." For example, apparel may be a mixed category. Merchants selling couture labels would be considered "discretionary," while mass-market apparel vendors would be considered "non-discretionary."

For a mixed industry category, all transactions in one year for all merchants that belong to that merchant category are extracted and summarized. An average ticket price for each merchant is computed. Then the distribution curve of the average ticket price at the merchant level is generated for the industry including the mean average ticket price for the merchant. This distribution curve is then used along with the specific merchant statistics to tag a merchant as either "non-discretionary" or "discretionary."

For example, suppose for the apparel industry the average ticket is $50 (across all merchants) and the standard deviation is $30. If for one vendor the average ticket is $25, that vendor will be flagged as "mon-discretionary" as it is below mean ($50). For a couture label, suppose the average ticket is $300—which is above the industry mean ticket ($50) and well over, say two standard deviations of the distribution, the couture merchant will be flagged as "discretionary."

The exercise of tagging a merchant as either "non-discretionary" or "discretionary" may be done once or infrequently. The table/database is refreshed and kept up to date on a regular basis (e.g. quarterly or yearly).

Using payment transaction data as in message 160 and merchant data as in table 200, the location of each consumer who makes a payment transaction may be determined. For example, based on the ZIP code of respective merchant(s) with whom a consumer conducts payment transaction(s), the consumer's location may be determined because people tend to patronize nearby merchants. Embodiments may assign a modeled ZIP code to each payment card account by evaluating the location (ZIP) of the merchants where the consumer has shopped.

Once the location of respective consumers is determined, transaction data associated with certain consumers or cards representative of a larger set may be collected. The representative set of consumers (or representative set of payment accounts, as each account is associated with a consumer) may be representative of consumers in a geographic region, e.g., the United States. This representative set may also be referred to as a panel. For example, according to U.S. census data, the distribution of the U.S. population into respective sub-regions (e.g., collections of U.S. states) may be determined. It should be understood that any region can be used, and any formulation of sub-regions can be used. Thus, a set of payment accounts may be selected (e.g., randomly) to approximately match the relevant geographic distribution of consumers. For example, if a region (e.g., country) has a population of one hundred million people with 50% of the population in state A, 30% of the population in state B, and 20% of the population in state C, a set of one million payment accounts (or some other number smaller than one hundred million, to facilitate computational load) can be identified automatically by a computer with a similar 50-30-20 percent breakdown. Clearly, the scale of such data sets makes the ensuing data processing intractable for manual (human without the aid of a computer) techniques.

Payment transactions of members of the panel extending a predetermined duration into the past (e.g., past 36 months) may be included for further processing. Such a snapshot of recent transactions provides a glimpse into the mentality of consumers, because it can be used to discern not just on what consumers were spending their money (e.g., discretionary purchases compared to non-discretionary purchases), but can also reveal trends over time. Transactions during this predetermined duration (time interval) may be used to compute various transaction based features such as total transactions during the time interval and total transaction amount (i.e., total dollar amount of the transactions) during the time interval. Each transaction-based feature can be automatically computed by a computer processor along one or more dimensions, such as merchant category (e.g., groceries, hardware, cruise line, jewelry) or discretionary versus non-discretionary.

The determination of whether a particular payment transaction corresponds to a discretionary or non-discretionary purchase can be made in a hierarchical manner. For example, in some embodiments, based on the merchant category code (MCC) of a merchant associated with a particular card transaction, the transaction can be immediately classified automatically into discretionary (e.g., if the MCC corresponds to betting/casino gambling), non-discretionary (e.g., if the MCC corresponds to gas stations), or "more information needed" (e.g., if the MCC corresponds to a category that could be either discretionary or non-discretionary, such as lodging). In the "more information needed" case, an additional check may be performed based on the merchant discretionary/non-discretionary flag 200*d*, e.g., to distinguish between lodging at a two-star hotel and a five-star hotel.

Figure 3:
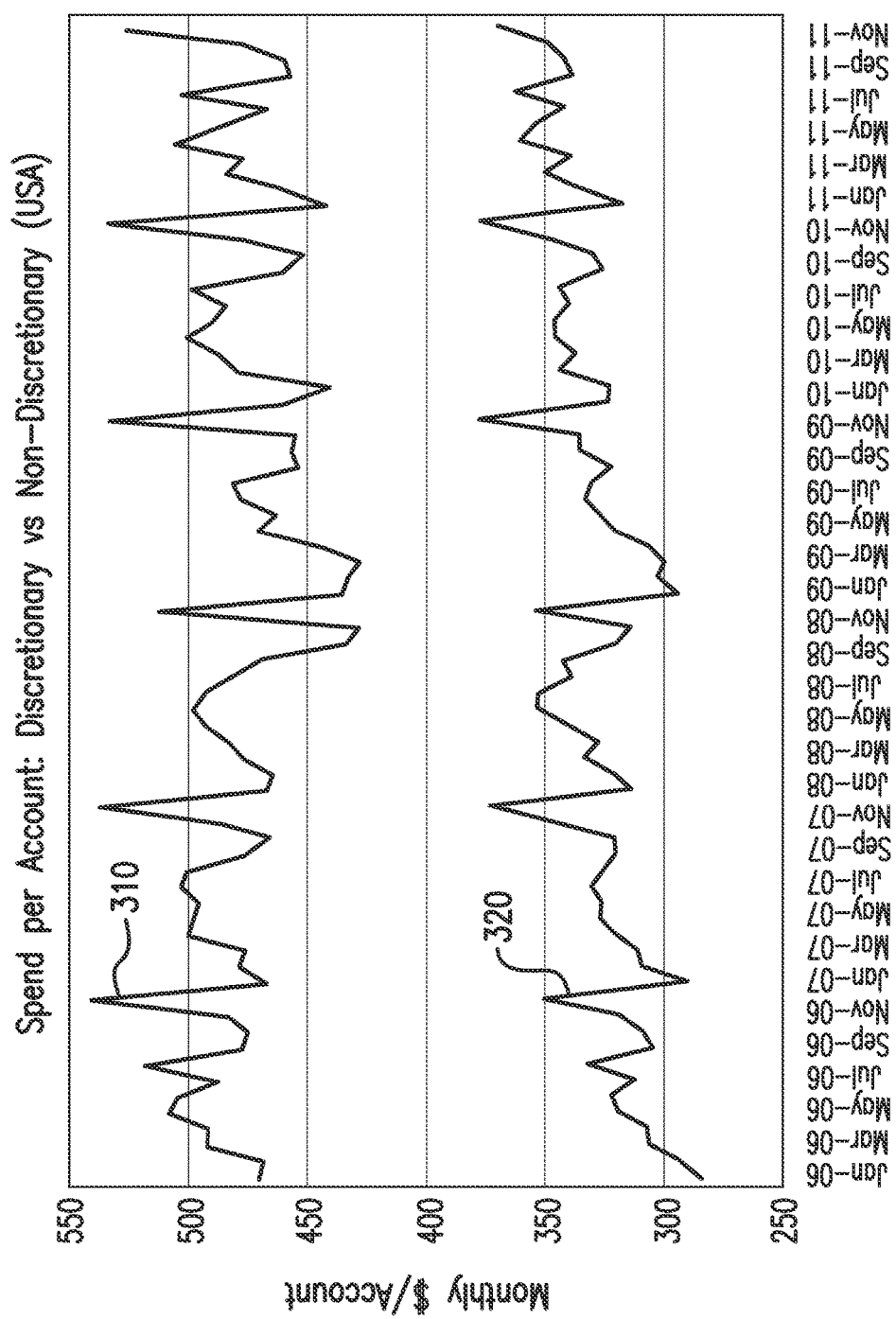
FIG. 3 is a plot of an example card transaction based feature computed for a plurality of card accounts and over a time interval in accordance with some embodiments.

Each transaction-based feature can be automatically computed over one or more time intervals, e.g., as shown in FIG. 3 for the example of monthly expenditures made with the payment account (total transaction amount) on discretionary purchases (plot 310) versus non-discretionary purchases (plot 320) for a multi-year interval, wherein each of plots 310 and 320 shows a composite (average) over all accountholders in the panel. Additional features may be automatically computed, e.g., ratio of discretionary purchases to total purchases (using either total number of transactions or total transaction amount for discretionary purchases and total purchases in this computation) or ratio of discretionary purchases to non-discretionary purchases (using either total number of transactions or total transaction amount for discretionary purchases and non-discretionary purchases in this computation) or the reciprocal of these features.

Thus, FIG. 3 can be considered to show a spending function that is evaluated for each accountholder and averaged across all accountholders, wherein the spending function is based on a payment transaction based feature (here, total transaction amount) and the transactions corresponding to said accountholder in a first set of transactions (e.g., discretionary purchase transactions) and/or a second set of transactions (e.g., non-discretionary purchase transactions).

Similarly, a feature based on any other dimension(s) (e.g., merchant categories) may be computed, such as ratio of grocery purchases (in terms of number or dollar amount) to restaurant purchases (in terms of number or dollar amount). Such a computation may reveal that accountholders have recently entered an upward trend regarding eating out at restaurants, which may indicate rising consumer sentiment because people typically spend more on eating out at restaurants when they are feeling comfortable or hopeful about their financial situations. The same accountholders may provide different responses when surveyed by a human (e.g., may respond that they are pessimistic about economic prospects) for various subjective reasons, but their actions may have more predictive power than words in revealing their actual mindset, perhaps at a subconscious level.

When individuals are more confident in the economy, they are more likely to engage in higher levels of discretionary spending, as shown in FIG. 3. After the downturn in the stock markets and overall U.S. and global economies in 2007, there was a significant decline in the discretionary spending of U.S. consumers in 2008 and 2009, reflecting decreased consumer confidence. In some embodiments of the present disclosure, the proportion of accountholders with an upward (or downward) trend in discretionary spending or any spending function is computed. Determination of the upward or downward trend may be performed by standard techniques in data analysis, e.g., smoothing of local anomalies and statistical significance levels. The proportion of accountholders exhibiting an upward (or downward) trend may be compared to a predetermined threshold (e.g., 70% of accountholders have recently engaged in decreased discretionary purchase transactions) to generate a consumer confidence index. Based on the proportion of accountholders in the panel trending upwards, downwards or remaining stable, confidence for consumers in a region as a whole can be determined to be trending upwards, downwards, or remaining stable. Alternatively, the consumer confidence index may be computed as any one of the plots in FIG. 3 themselves, or as any other expression based on one or more card transaction based features evaluated for respective card transactions.

The computed consumer confidence index can be refreshed or recomputed on an aperiodic or periodic (e.g., daily, weekly, or monthly) basis to monitor evolving consumer sentiment. Such computation and refreshing on a fine granularity time basis is not possible without the computerized implementation of embodiments of the present disclosure. For example, humans cannot reasonably process manually the vast amount of data (e.g., millions of payment accounts) associated with card transactions across an entire state or country over various time periods to ensure that the panel is geographically representative and to arrive at various possible transaction based features. By integrating the processing with existing data sets and databases (e.g., database 150 containing transaction data and table 200, the large-scale data processing computations described herein are made feasible.

Thus, a consumer confidence index is computed and tracked in some embodiments based on objective, quantified transaction data. By drawing from a large input data set (e.g., all card transaction data for consumers in a large region such as a country or even a global data set), sentiment of consumers in a nation or even the world can be monitored efficiently and reliably. By tying the identity of the panel (representative set of accounts) to a population distribution in a geographic region, statistical validity is ensured. Consequently, the drawbacks of conventional survey-based confidence indices are avoided. Consumer confidence can be recomputed for any time interval or geographic region without much additional effort, unlike manual poll-based approaches.

The computer consumer confidence index can be stored for further processing, or it can be displayed, e.g., at a user interface with a plot similar to FIG. 3. In some embodiments, a consumer confidence index is generated and distributed in a printed form. In other embodiments, an interactive system allows a user to drill-down, for example, on geography, gender, and other available demographic markers of the consumer confidence index.

Figure 4:
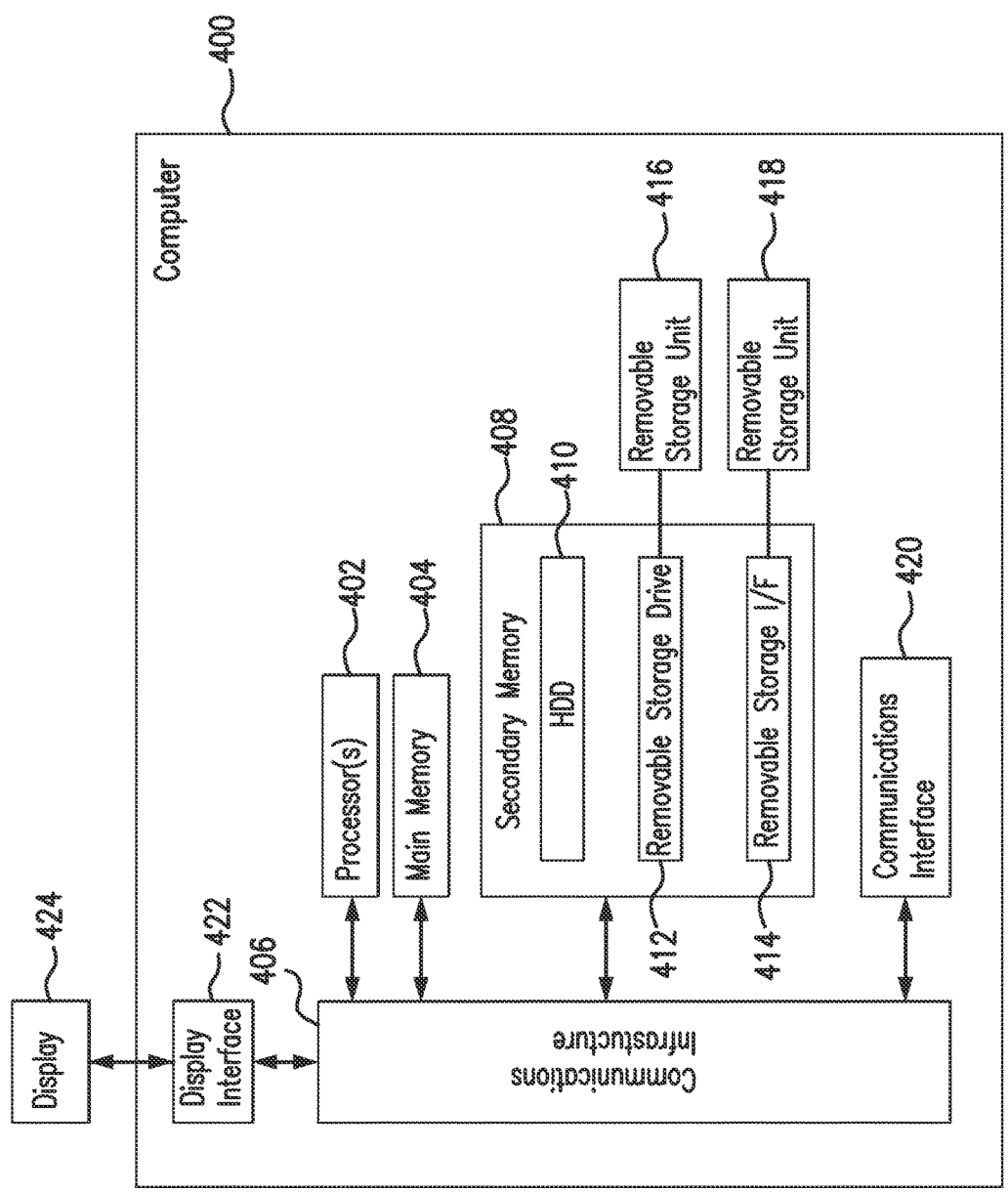
FIG. 4 is an example architecture diagram of a computer system used in some embodiments.

FIG. 4 is an architecture diagram of a computer 400 that may be used in some embodiments. The architecture of computer 400 may be used to implement a computer that computes a consumer confidence index. Computer system 400 may include one or more processors 402. Each processor 402 is connected to a communication infrastructure 406 (e.g., a communications bus, cross-over bar, or network). Computer system 400 may include a display interface 422 that forwards graphics, text, and other data from the communication infrastructure 406 (or from a frame buffer, not shown) for display on the display unit 424, e.g., for displaying a consumer confidence index or feature(s) associated with a consumer confidence index as in FIG. 3. Alternatively, the features or confidence index may be displayed on a display separate from the computer that computes the features or confidence index.

Computer system 400 may also include a main memory 404, such as a random access memory (RAM), and a secondary memory 408. The secondary memory 408 may include, for example, a hard disk drive (HDD) 410 and/or removable storage drive 412, which may represent a floppy disk drive, a magnetic tape drive, an optical disk drive, a memory stick, or the like as is known in the art. The removable storage drive 412 reads from and/or writes to a removable storage unit 416. Removable storage unit 416 may be a floppy disk, magnetic tape, optical disk, or the like. As will be understood, the removable storage unit 416 may include a computer readable storage medium having tangibly stored therein (embodied thereon) data and/or computer software instructions, e.g., for causing the processor(s) to perform various operations.

In alternative embodiments, secondary memory 408 may include other similar devices for allowing computer programs or other instructions to be loaded into computer system 400. Secondary memory 408 may include a removable storage unit 418 and a corresponding removable storage interface 414, which may be similar to removable storage drive 412, with its own removable storage unit 416. Examples of such removable storage units include, but are not limited to, USB or flash drives, which allow software and data to be transferred from the removable storage unit 416, 418 to computer system 400.

Computer system 400 may also include a communications interface 420. Communications interface 420 allows software and data to be transferred between computer system 400 and external devices. Examples of communications interface 420 may include a modem, Ethernet card, wireless network card, a Personal Computer Memory Card International Association (PCMCIA) slot and card, or the like. Software and data transferred via communications interface 420 may be in the form of signals, which may be electronic, electromagnetic, optical, or the like that are capable of being received by communications interface 420. These signals may be provided to communications interface 420 via a communications path (e.g., channel), which may be implemented using wire, cable, fiber optics, a telephone line, a cellular link, a radio frequency (RF) link and other communication channels.

In this document, the terms "computer program medium" and "non-transitory computer-readable storage medium" refer to media such as, but not limited to, media at removable storage drive 412, or a hard disk installed in hard disk drive 410, or removable storage unit 416. These computer program products provide software to computer system 400. Computer programs (also referred to as computer control logic) may be stored in main memory 404 and/or secondary memory 408. Computer programs may also be received via communications interface 420. Such computer programs, when executed by a processor, enable the computer system 400 to perform the features of the methods discussed herein. For example, main memory 404, secondary memory 408, or removable storage units 416 or 418 may be encoded with computer program code (instructions) for performing operations corresponding to various processes disclosed herein.

Figure 5:
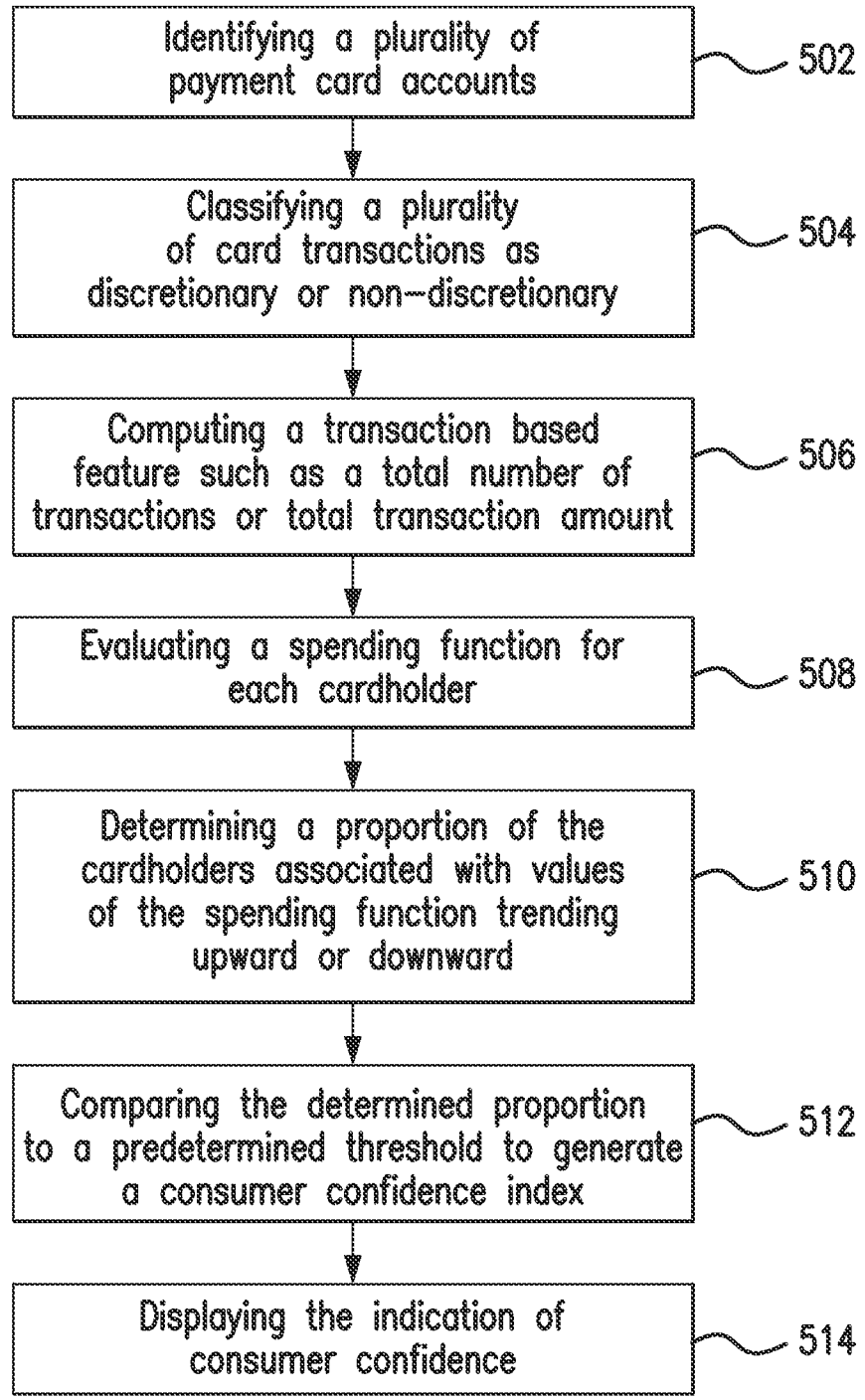
FIG. 5 is a flow diagram of a method embodiment.

FIG. 5 is a flow diagram of a process in accordance with some embodiments. After process 500 begins, a plurality of payment card accounts are identified as corresponding to respective accountholders, block 502. A geographic distribution of the accountholders is statistically representative of a geographic distribution of consumers in a geographic region.

At one or more processors 402, a plurality of card transactions associated are classified with the plurality of payment accounts over a time interval into a first set of transactions and a second set of transactions, block 504. In some embodiments, the first set of transactions may be discretionary purchase transactions and the second set may be a non-discretionary purchase set of transactions. In other embodiments, the first set of transactions includes transactions corresponding to a first merchant category, and the second set of transactions comprises transactions corresponding to a second merchant category.

Each card transaction in the plurality of card transactions may be classified into the first or second set of transactions based on a flag associated with a merchant or a merchant category code corresponding to the card transaction, wherein the flag is stored in a computer database 150.

The processors compute, for both sets of transactions, at least one card transaction based feature, block 506. In some embodiments, the transaction based feature could be a total number of transactions or a total transaction amount.

The geographic region includes a plurality of subregions. Each subregion includes a plurality of states of the United States, and a accountholder distribution for the respective subregions is approximately equal to a population distribution for the respective subregions.

The processor 402 evaluates a spending function for each accountholder, block 508. The spending function is based on the at least one card transaction based feature and the transactions corresponding to the accountholder in at least one of the first and second sets of transactions; and At block 510, the processor 402 determines a proportion of the accountholders associated with values of the spending function that are trending in a direction selected from the group consisting of upward and downward.

Comparing the determined proportion to a predetermined threshold, the processor 402 generates a consumer confidence index for the geographic region, block 512.

The indication of consumer confidence is displayed for consumers in the geographic region based on the at least one payment transaction based feature and the sets of discretionary purchase transactions and non-discretionary purchase transactions, block 514.

Figure 6:
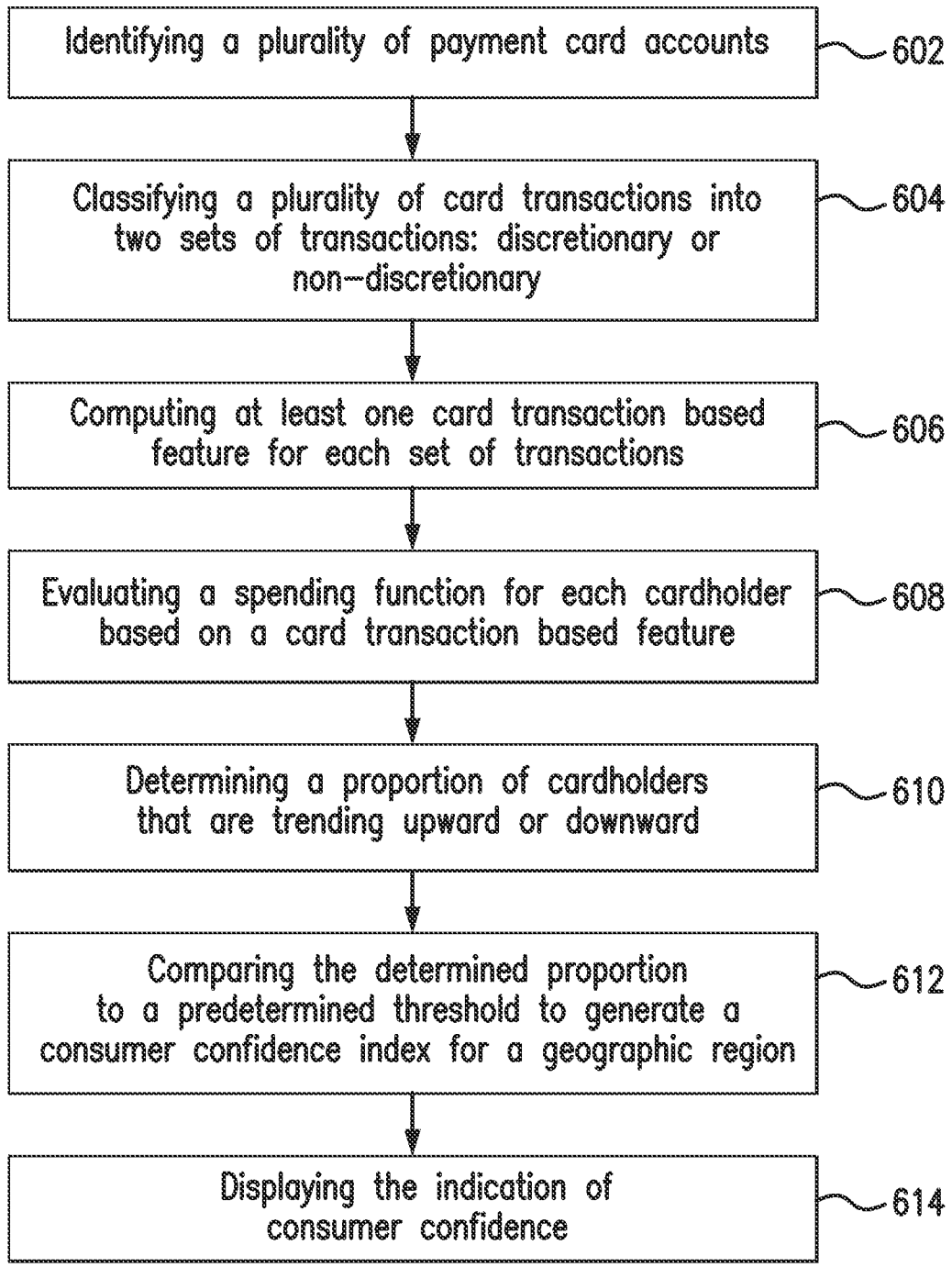
FIG. 6 is a flow diagram of an alternate method embodiment.

FIG. 6 is a flow diagram of a process in accordance with some embodiments. After process 600 begins, processor 402 identifies a plurality of payment accounts corresponding to respective accountholders among a plurality of accountholders, block 602. A geographic distribution of the accountholders is statistically representative of a geographic distribution of consumers in a geographic region.

The processor 402 classifies a plurality of card transactions associated with the plurality of payment accounts over a time interval into a first set of discretionary purchase transactions and a second set of non-discretionary purchase transactions, block 604. Each card transaction in the plurality of card transactions is classified into the first or second set of transactions based on a flag associated with a merchant or a merchant category code corresponding to said card transaction. The flag is stored in a computer database.

For the first set of discretionary purchase transactions and the second set of non-discretionary purchase transactions, the processor computes at least one card transaction-based feature, block 606. Each card transaction based feature is one of a total number of transactions and a total transaction amount.

The processor 402 evaluates a spending function for each accountholder, block 608. The spending function is based on the at least one card transaction based feature and the transactions corresponding to the accountholder in at least one of the first and second sets of transactions;

The processor 402 is then able to determine a proportion of the accountholders associated with values of the spending function that are trending in a direction upward and downward, block 610.

By comparing the determined proportion to a predetermined threshold, the processor 402 is able to generate a consumer confidence index for the geographic region, block 612.

The system is then able to provide to a display an indication of consumer confidence for consumers in the geographic region based on the at least one card transaction-based feature and the first and second sets of transactions, block 614. The indication is provided for respective months in the time interval.

It is understood by those familiar with the art that the system described herein may be implemented in hardware, firmware, or software encoded on a non-transitory computer-readable storage medium.

The systems and processes are not limited to the specific embodiments described herein. In addition, components of each system and each process can be practiced independent and separate from other components and processes described herein.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What is claimed is:

1. A method comprising:
identifying a plurality of payment accounts corresponding to respective accountholders associated with a geographic region;
classifying a plurality of card transactions associated with the plurality of payment accounts over a time interval into a luxury set of transactions, an essential set of transactions, or a mixed set of transactions, wherein each card transaction of the plurality of card transactions is associated with a merchant and a merchant category;
generating a merchant average ticket price for each merchant associated with the mixed set of transactions and a first merchant category;
generating an industry average ticket price and an industry ticket price deviation for the first merchant category;
reclassifying one or more card transactions in the mixed set of transactions into either the luxury set of transactions or the essential set of transactions based on the merchant average ticket prices, the industry average ticket price, and the industry ticket price deviation;
determining, for the luxury set of transactions and the essential set of transactions, at least one card transaction-based feature;
evaluating a spending function for each accountholder based on the at least one card transaction-based feature and the transactions corresponding to the accountholder in at least one of the luxury set of transactions or the essential set of transactions;
determining a proportion of the respective accountholders associated with values of the spending function that are trending upward or downward;
generating, based on the determined proportion and a predetermined threshold, a consumer confidence index for the geographic region;
displaying, on a display of a computer system, the consumer confidence index for consumers in the geographic region based on the at least one card transaction-based feature, the luxury set of transactions, and the essential set of transactions; and
displaying, on the display of the computer system, the proportion of the respective accountholders associated with values of the spending function that are trending upward or downward.

2. The method of claim 1, wherein each card transaction in the plurality of card transactions is classified into the luxury set of transactions, the mixed set of transactions, or the essential set of transactions based on a flag associated with a merchant or a merchant category code corresponding to the card transaction, wherein the flag is stored in a computer database.

3. The method of claim 1, wherein the luxury set of transactions comprises card transactions corresponding to a luxury merchant category, and the essential set of transactions comprises card transactions corresponding to an essential merchant category.

4. The method of claim 1, wherein the at least one card transaction-based feature comprises a total number of transactions.

5. The method of claim 1, wherein the at least one card transaction-based feature comprises a total transaction amount.

6. The method of claim 1, wherein the geographic region includes a plurality of subregions, each subregion includes a plurality of states of the United States, and an accountholder distribution for the respective subregions is a population distribution for the respective subregions.

7. The method of claim 1, wherein the mixed set of transactions comprises card transactions corresponding to a mixed merchant category.

8. The method of claim 1, wherein the respective accountholders are statistically representative of a geographic distribution of consumers in the geographic region.

9. A non-transitory computer readable medium having instructions embodied tangibly thereon, the instructions when executed causing a computer processor to perform the operations of:
identifying a plurality of payment accounts corresponding to respective accountholders associated with a geographic region;
classifying a plurality of card transactions associated with the plurality of payment accounts over a time interval into a luxury set of transactions, an essential set of transactions, or a mixed set of transactions, wherein each card transaction of the plurality of card transactions is associated with a merchant and a merchant category;
generating a merchant average ticket price for each merchant associated with the mixed set of transactions and a first merchant category,
generating an industry average ticket price and an industry ticket price deviation for the first merchant category;
reclassifying one or more card transactions in the mixed set of transactions into either the luxury set of transactions or the essential set of transactions based on the merchant average ticket prices, the industry average ticket price, and the industry ticket price deviation;
determining, for the luxury set of transactions and the essential set of transactions, at least one card transaction-based feature;
evaluating a spending function for each accountholder based on the at least one card transaction-based feature and the transactions corresponding to the accountholder in at least one of the luxury set of transactions or the essential set of transactions;
determining a proportion of the respective accountholders associated with values of the spending function that are trending-upward or downward;
generating, based on the determined proportion and a predetermined threshold, a consumer confidence index for the geographic region;
displaying, on a display of a computer system, the consumer confidence index for consumers in the geographic region based on the at least one card transaction-based feature, the luxury set of transactions and the essential set of transactions; and
displaying, on the display of the computer system, the proportion of the respective accountholders associated with values of the spending function that are trending upward or downward.

10. The computer readable medium of claim 9, wherein the luxury set of transactions comprises card transactions corresponding to a luxury merchant category, and the essential set of transactions comprises card transactions corresponding to an essential merchant category.

11. The computer readable medium of claim 9, wherein the at least one card transaction-based feature comprises a total number of transactions.

12. The computer readable medium of claim 9, wherein the at least one card transaction-based feature comprises a total transaction amount.

13. The computer readable medium of claim 9, wherein the geographic region includes a plurality of subregions, each subregion includes a plurality of states of the United States, and an accountholder distribution for the respective subregions is a population distribution for the respective subregions.

14. The computer readable medium of claim 9, wherein the mixed set of transactions comprises card transactions corresponding to a mixed merchant category.

15. The computer readable medium of claim 9, wherein the respective accountholders are statistically representative of a geographic distribution of consumers in the geographic region.

16. A method comprising:
identifying a plurality of payment accounts corresponding to respective accountholders among a plurality of accountholders associated with a geographic region;
classifying a plurality of card transactions associated with the plurality of payment accounts over a time interval into a luxury set of transactions, an essential set of transactions, or a mixed set of transactions, wherein each card transaction of the plurality of card transactions is associated with a merchant and a merchant category;
generating a merchant average ticket price for each merchant associated with the mixed set of transactions and a first merchant category,
generating an industry average ticket price and an industry ticket price deviation for the first merchant category;
reclassifying one or more card transactions in the mixed set of transactions into either the luxury set of transactions or the essential set of transactions based on the merchant average ticket prices, the industry average ticket price, and the industry ticket price deviation;
determining, for the luxury set of transactions and the essential set of transactions, at least one card transaction-based feature, wherein each card transaction-based feature is one of a total number of transactions and a total transaction amount;
evaluating a spending function for each accountholder based on the at least one card transaction-based feature and the transactions corresponding to the accountholder in at least one of the luxury set of transactions or the essential set of transactions;
determining a proportion of the respective accountholders associated with values of the spending function that are trending upward or downward;
generating, based on the determined proportion and a predetermined threshold, a consumer confidence index for the geographic region;
displaying, on a display of a computer system, the consumer confidence index for consumers in the geographic region based on the at least one card transaction-based feature, the luxury set of transactions, and the essential set of transactions; and
displaying, on the display of the computer system, the proportion of the respective accountholders associated with values of the spending function that are trending upward or downward.

17. The method of claim 16, wherein each card transaction in the plurality of card transactions is classified into the luxury set of transactions, the mixed set of transactions, or the essential set of transactions based on a flag associated with a merchant or a merchant category code corresponding to the card transaction, wherein the flag is stored in a computer database.

18. The method of claim 16, wherein the respective accountholders among the plurality of accountholders are statistically representative of a geographic distribution of consumers in the geographic region.

* * * * *